United States Patent [19]

Singh et al.

[11] Patent Number: 4,534,029
[45] Date of Patent: Aug. 6, 1985

[54] FAULT ALIGNMENT CONTROL SYSTEM AND CIRCUITS

[75] Inventors: Shanker Singh, Fishkill, N.Y.; Vijendra P. Singh, San Jose, Calif.

[73] Assignee: International Business Machines Corporation, Armonk, N.Y.

[21] Appl. No.: 478,594

[22] Filed: Mar. 24, 1983

[51] Int. Cl.³ .................. G11C 11/40; G06F 11/04
[52] U.S. Cl. .................................... 371/10; 365/200
[58] Field of Search ............... 371/10, 8, 21; 364/200, 364/900; 365/104, 105, 200, 207, 210

[56] References Cited

U.S. PATENT DOCUMENTS

| | | | |
|---|---|---|---|
| 4,047,163 | 9/1977 | Choate | 371/10 |
| 4,051,354 | 9/1977 | Choate | 371/10 |
| 4,051,460 | 9/1977 | Yamada et al. | 371/10 |
| 4,191,996 | 3/1980 | Chesley | 371/10 |
| 4,355,376 | 10/1982 | Gould | 371/10 |
| 4,389,715 | 6/1983 | Eaton et al. | 371/10 |
| 4,441,170 | 4/1984 | Folmsbee et al. | 371/10 |
| 4,450,559 | 5/1984 | Bond et al. | 371/10 |
| 4,459,685 | 7/1984 | Sud et al. | 371/10 |

Primary Examiner—Michael R. Fleming
Attorney, Agent, or Firm—James E. Murray

[57] ABSTRACT

This permutation circuit can be considered to be a multi-bit adder without a carry. In one embodiment it takes the form of m address bits being fed to m+y 2-way exclusive OR gates with m+y permutation bits to generate m+y input bits accessing a decoder with $2^m$ output positions. In another embodiment the decoder takes the form an m bit adder with which adds m address bits to m permutation bits to generate m bit actual address. Multiple decoders of both types may be joined together in various combinations to generate higher order addresses. Also, k full-adder of less than m bits can also be used in similar fashion as m+y Exor gates to provide shift rotate capability within a desired block of $2^y$ rows.

5 Claims, 11 Drawing Figures

FIG. 3
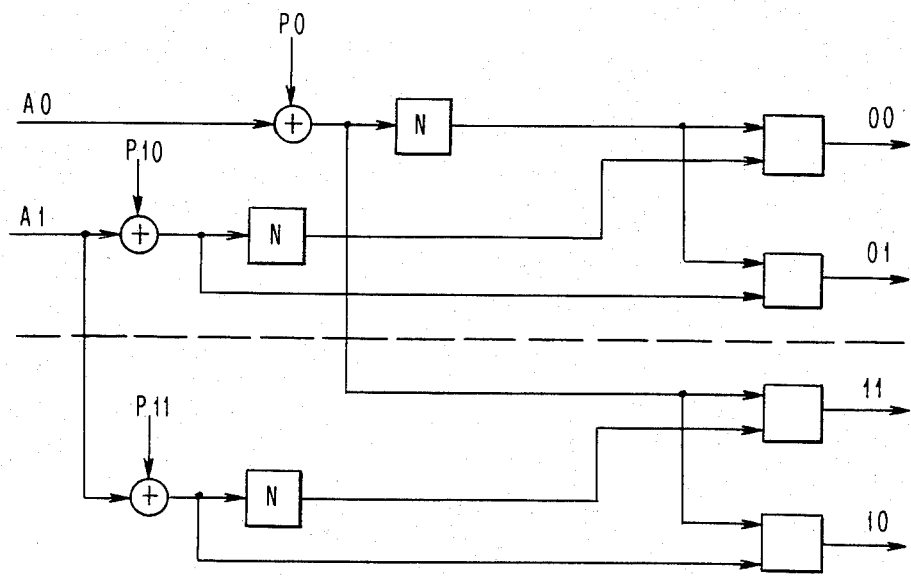
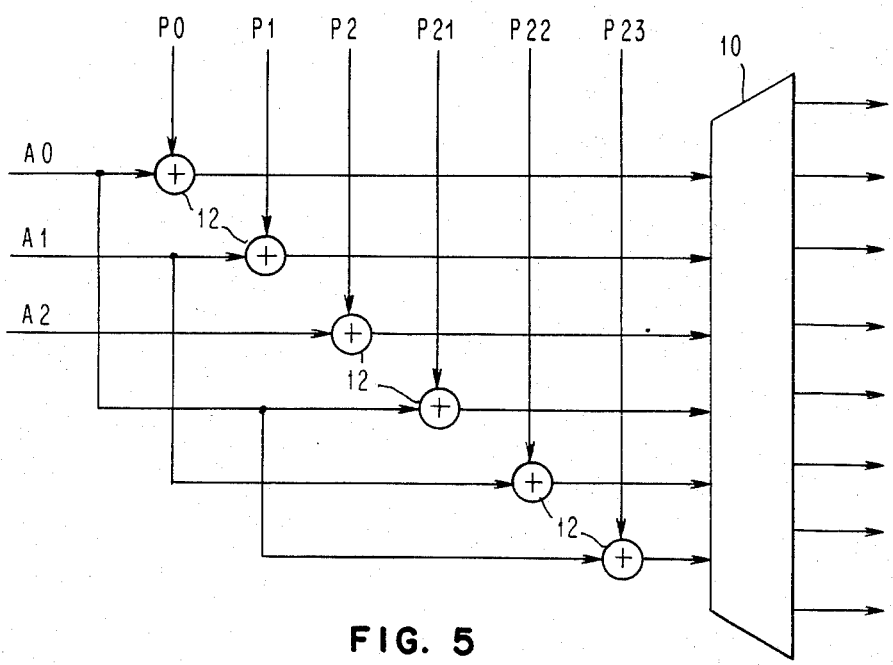
FIG. 5

FAULT ALIGNMENT CONTROL SYSTEM AND CIRCUITS

BACKGROUND OF THE INVENTION

The present invention relates to permutation logic for changing words with uncorrectable errors (UE's) into memory words that can be corrected by the error correcting code protecting the data in the memory.

In co-pending Bossen et al patent application No. 362,925 filed Mar. 29, 1982 now matured into U.S. Pat. No. 4,461,001 issued July 17, 1984 and entitled "Deterministic Permutation Algorithm", a memory address register accesses a memory word by supplying the same logical address to decoders for all bit positions of the word. However, as a result of modification by logic circuitry the address actually applied to the decoder of any particular bit position can differ from the logical address supplied by the address register. The logic circuitry is called permutation logic. Because of the permutation logic, a memory word can contain storage cells located at a number of different physical addresses that are not the logical address supplied by the memory register.

The permutation logic of the Bossen et al patent application performs a single Exclusive OR function on each of the n inputs to the decoder of the particular bit position. Each of the n digits of the word address is Exclusive ORed with a different bit to permute the address.

If the bit decoder is a two bit decoder, the mentioned permutation logic can provide to the decoder $2^n$ or four different combinations or sequences of bit inputs. These are shown in Table 1.

TABLE 1

| Input Bits | Permutation Bits |  |  |  |
|---|---|---|---|---|
|  | Z1 Z0 |  |  |  |
| C1,C0 | 00 | 01 | 10 | 11 |
| 00 | 00 | 01 | 10 | 11 |
| 01 | 01 | 00 | 11 | 10 |
| 10 | 10 | 11 | 00 | 01 |
| 11 | 11 | 10 | 01 | 00 |

These four sequences form only a small subset of the possible decoder input sequences. There are actually $2^n!$ or 24 possible input sequences for a two bit decoder. The decimal equivalents of all possible sequences are shown in Table 2.

TABLE 2

| Decoder Inputs Bits | | Possible Input Sequences | | | | | | | | | | | | | | | | | | | | | | |
|---|---|---|---|---|---|---|---|---|---|---|---|---|---|---|---|---|---|---|---|---|---|---|---|---|
| C1 | C0 | | | | | | | | | | | C1' | | C0' | | | | | | | | | | |
| 0 | 0 | 0 | 0 | 0 | 0 | 0 | 0 | 1 | 1 | 1 | 1 | 1 | 1 | 2 | 2 | 2 | 2 | 2 | 3 | 3 | 3 | 3 | 3 | 3 |
| 0 | 1 | 1 | 3 | 2 | 2 | 3 | 1 | 0 | 3 | 2 | 2 | 3 | 0 | 1 | 3 | 0 | 0 | 3 | 1 | 1 | 0 | 2 | 2 | 0 | 1 |
| 1 | 0 | 2 | 1 | 3 | 1 | 2 | 3 | 2 | 0 | 3 | 0 | 2 | 3 | 0 | 1 | 3 | 1 | 0 | 3 | 2 | 1 | 0 | 1 | 2 | 0 |
| 1 | 1 | 3 | 2 | 1 | 3 | 1 | 2 | 3 | 2 | 0 | 3 | 0 | 2 | 3 | 0 | 1 | 3 | 1 | 0 | 0 | 2 | 1 | 0 | 1 | 2 |

It turns out that certain UE conditions cannot be satisfactorily resolved using any of the $2^n$ input sequences in Table 1 where these same UE conditions could readily be allieviated if one of the other theoretically possible n! input sequences shown in Table 2 were achievable.

Co-pending Bond patent application No. 381,266 filed May 24, 1982 and entitled "Fault Alignment Control System and Circuits" now matured into U.S. Pat. No. 4,489,403 issued Dec. 18, 1984 discloses logic capable of providing more than the $2^n$ input combinations listed in Table 1. However, the disclosed permutation devices are not "linear". Unlike the permutation devices in the referenced Bossen et al patent application, the value of permutation bits needed to access a known actual address with a given logical address cannot be calculated. Instead a table lookup scheme has to be employed to obtain the permutation bits that are necessary to transpose a logical address into an actual address. Furthermore, when expanded beyond two address bits the translation of one address in one group of four addresses will be reflected in all other groups of four addresses.

An F. J. Aichelmann, Jr. et al patent application No. 429,644, filed Sept. 30, 1982 and entitled "Memory Address Permutation Apparatus" discloses a single permutation apparatus which transposes a single logical address into a different actual address for any number of the bit positions of an accessed memory and this selection scheme allows translation word lines without affecting data in other pairs of word lines but the actual addresses are selected sequentially and the selection scheme is not linear.

The Invention

In accordance with the present invention a new permutation circuit is employed. This permutation circuit can be considered a full group adder without a carry where the group can be considered to be m bits. In one embodiment it takes the form of m address bits being fed to (m+y), 2-way exclusive OR gates with m+y permutation bits to generate $2^{m+y}$ translations of $2^m$ output positions. In another embodiment the decoder takes the form of an m bit adder or k+n bit full adder where n+k>m while n<m with which adds m address bits to m permutation bits to generate m bit actual address or n+k permutation bit to generate $2^{n+k}$ translation on $2^m$ addresses. Multiple decoders of both types may be joined together in different combinations to generate higher order addresses.

Therefore it is an object of the present invention to provide a new permutation apparatus for swapping bits in memory words to change uncorrectable errors into correctable error conductions.

It is another object of the present invention to swap bits to provide more combinations of permutations of address bits to the input decoder.

It is another object of the present invention to provide permutation apparatus capable of swapping bits in blocks independent of other blocks.

THE DRAWINGS

These and other objects of the present invention can be best understood by referring to the figures of the drawings of which:

FIGS. 1 to 7, 9, 10 and 11 are circuit diagrams of permutation logic in accordance with the present invention and, FIG. 8 is a graphic representation of a permutations bit determination algorithm that can be employed with the embodiments of the invention shown in FIGS. 1 to 7.

DETAILED DESCRIPTION

Figure 2:
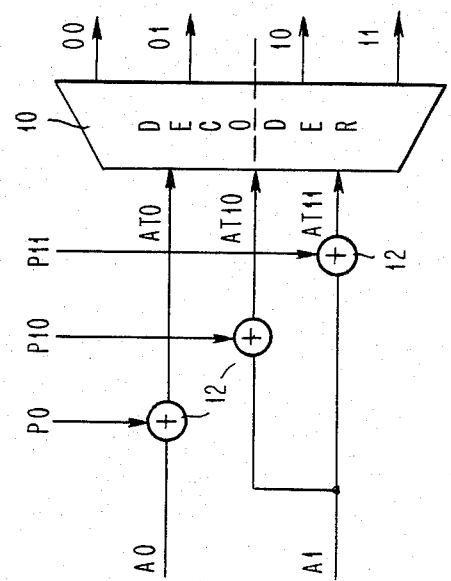
Figure 1:
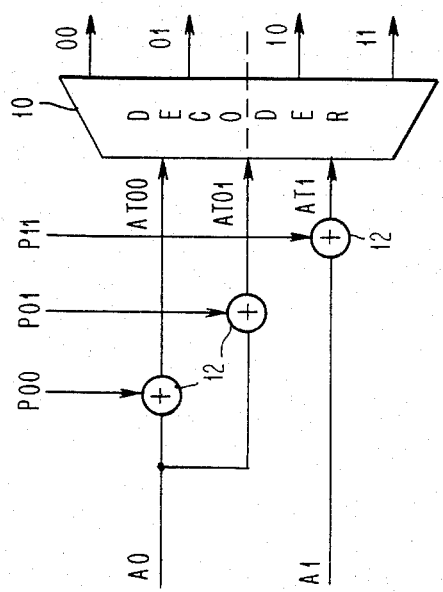

As shown in FIGS. 1 and 2 two address bits A0 and A1 and permutation bits P00, P01 and P1 or P0, P10 and P11 allows $2^3$ way address translation on 4 addresses. The three translated inputs At0, At01, At11 or At0, At10, At11 when applied to decoders 10 select one output out of 4. Since the translation (permutation) controls P00, P01 in FIG. 1 and P10 and P11 are independent, these can be used independently in each block of two addresses, these schemes double the number of address translation obtainable by address bit A0 and A1. To generate the three input bits for the decoder from two address bits, one of the address bits A1 or A2 is exclusive-ORed with each of three permutation bits in a 2-way exclusive OR circuit. This means that one of the address bits gets exclusive-ORed with more than one permutation bit in each of the embodiments to generate the third input bit to the decoder 10. As can be seen by the tables in the figures, the permutations can be extended by circuits which can provide more than $2^n$ ways of translation of two address bits. The circuits of FIGS. 1 and 2 each extend to allow eight ways of address translation of a $2^2$ row space. These two address translation functions are represented by two subsets of columns (1,2,7,8,17,18,23, and 24) and (1,6,8,10,15,17,19 and 24) in Table 2 respectively. These circuit realizations divide the address space of four rows into two blocks of two rows as divided by the dotted lines in the tables and the schematic. The address translation within any one block can be accomplished independently of the other, by judicious selection of the permutation inputs. For instance, in FIG. 3, bit subsets 1 and 2 swap data on lines 10 and 11 without affecting data on the 00 and 10 word lines. This independence is obtained at the cost of an extra Exor gate an address translation bit.

Figure 4:
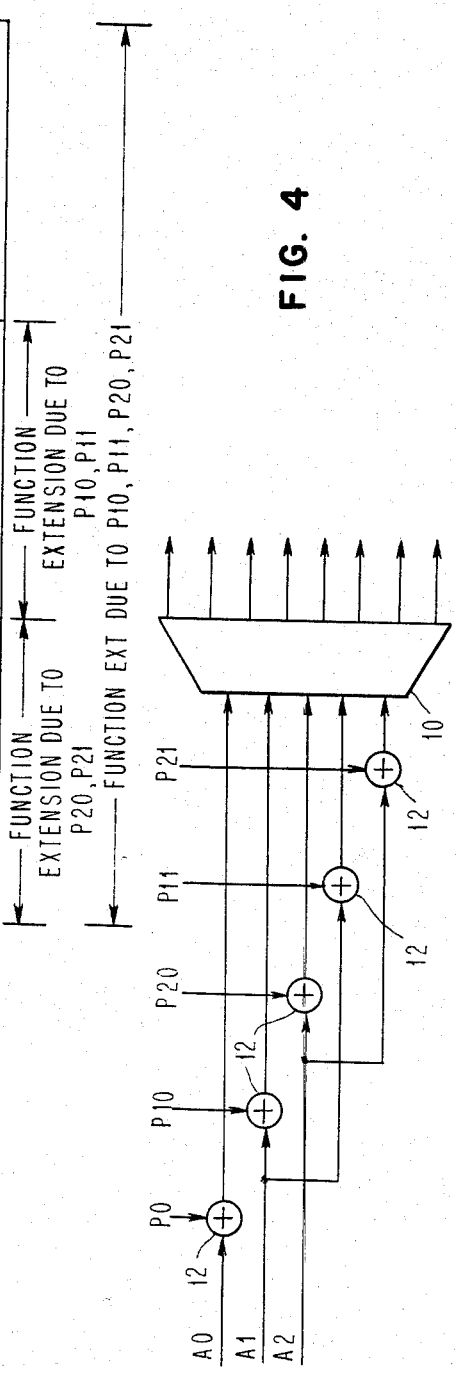

To provide a better understanding of flexibility of these circuits in selecting the address translation control bits, the number of blocks, and the size of blocks in a memory of a given size, the possible variations of address translation function and their circuit implementations for an address space of $2^3$ rows are discussed. FIG. 4 shows a 2-block address translation function. Eight row address space is divided into two blocks of four rows. The circuit implementation requires five Exor gates 12 with five address translation control bits p, thereby providing 32 ways of translation of 8-row address space. It is also possible to construct a circuit such as shown in FIG. 5, capable of providing 64 ways of address translation for the same address space of 8 rows. The decoder 10 here would be two of the decoders of FIG. 3 to accommodate twice the input and provide twice the outputs. This arrangement divides the address space into 4 blocks of two rows each. As in the case of FIGS. 1 and 2 address translation within any block is possible without affecting the others, if so desired.

Figure 6:
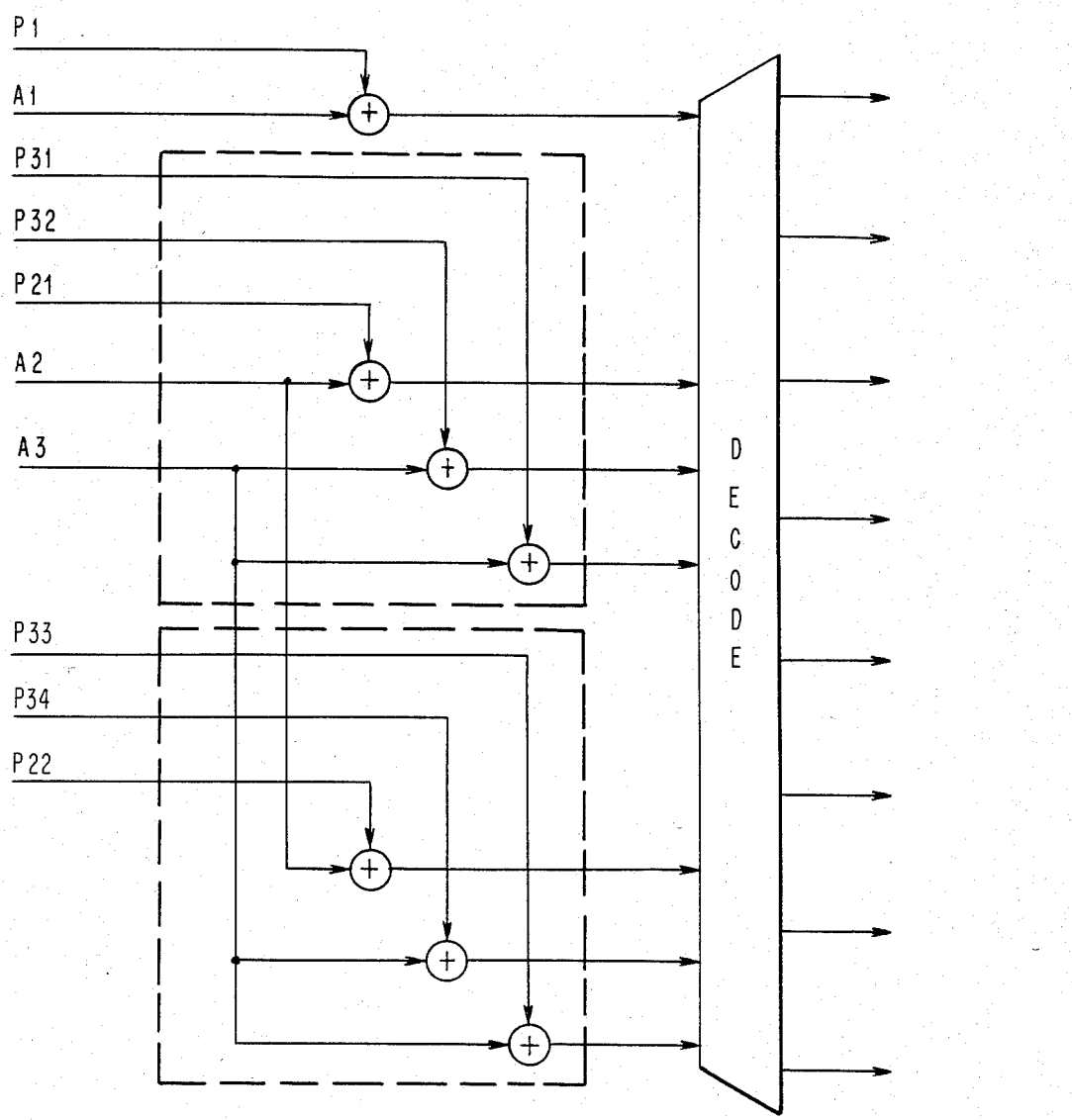

FIG. 6 illustrates one of many possible generalalizations of the linear circuits to translate 3 to 8 decoders. Here, the address space of 8 rows can be translated in either 8,16,32,64 - - - 128 ways. This is accomplished by first subdividing the address space into two blocks. This is followed by subdividing the address space within each such block into two subblocks of two rows each. This circuit implementation requires 7 Exor gates and 7 address translation control bits. If the address translation bits P21 and P22 assume identical values, then circuit of FIG. 6 behaves like a circuit of FIG. 5. If address translation bits P21, P22 always assume identical values and P31,P32,P33 and P34 also assume identical values then it results in a circuit behavior as if the circuit has 3 Exor gates and 3 address translation control bits.

Figure 7:
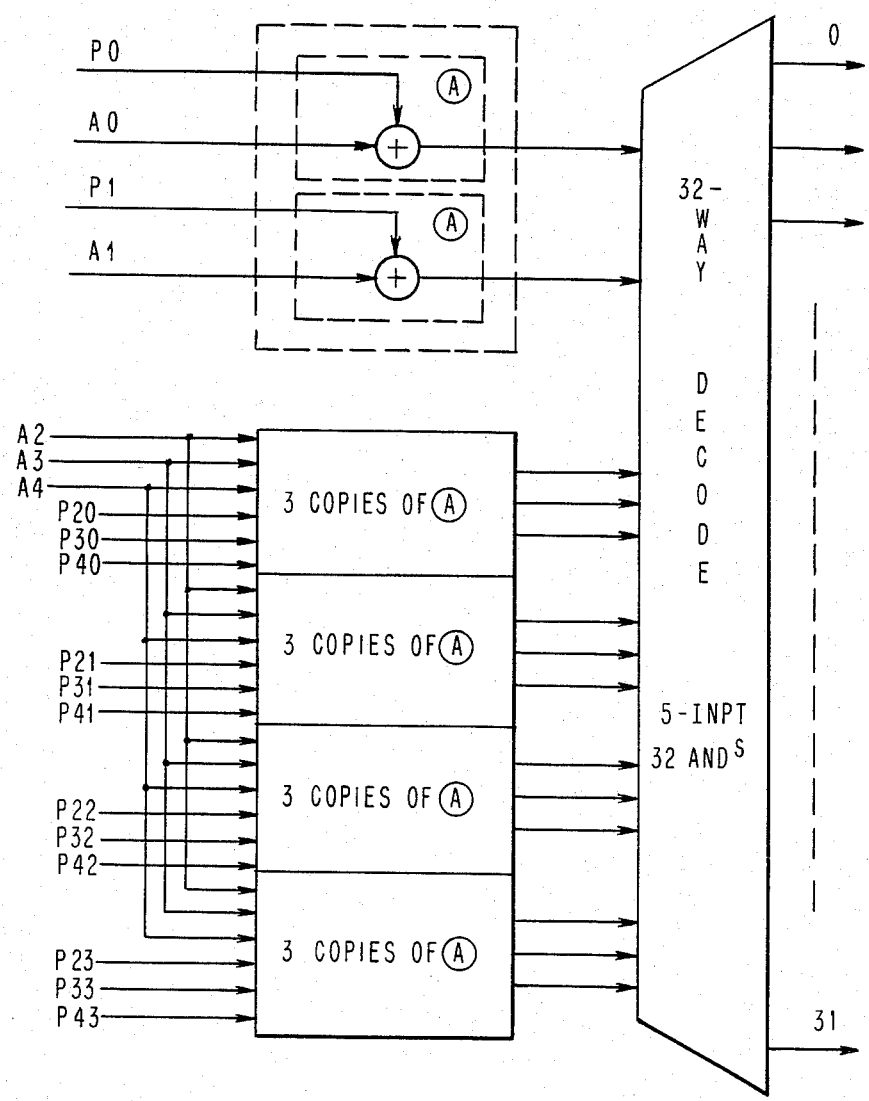

The circuit of FIG. 7 divides the address space of 32 chip rows accessed by 5 address bits into 4 blocks of 8 chip rows, thereby confining the logical movement of faults within a specified block of 8 chip rows, if so desired. Since there are 14 address translation control bits the address space of 32 chip rows in a card can be reconfigured in ($2^{14}$=16384) ways. Having all this power of translation, if a highly efficient, and convergent algorithm which can by systematically used in determining the most appropriate value of translation control cannot be devised then such powerful translation circuits are of no use. Fortunately, algorithms such as described in copending U.S. patent application No. 383,640 filed June 1, 1982 and entitled "A Method of Memory Reconfiguration for Fault Tolerant Memory" can be efficiently used for any circuit in the class defined as linear.

Consider a circuit of FIG. 6, where the address space of 8 row is divided into 2 blocks of 4 rows, where each block in turn is again sub-divided into 2 sub-blocks. The first step for determining the values of address control bits is to conceptually imaging this circuit of one block with 8 address rows. This is possible by assuming as if P21 and P22 are tied together and P31, P32, P33, P34 are also tied together. Conceptually it implies that a 1-block level P21 and P22 always assume identical values and P21, P32, P33 and P34 also assume identical values. Let us suppose that the algorithm described in (1) finds "101" as the most suitable 3 bit value for address translation control for a section of a memory. In terms of circuit description of FIG. 7 it implies that P1 is found to be equal to '1', P21, P22 are found to be "0,0" and P31, P32, P33 and P34 are found to be "1,1,1,1" respectively. This step can be considered as a step to achieve global reconfiguration of the memory leaving minimum possible fault alignments. Let us suppose that after step 1 two fault alignments are left in block 1, while no faults are left aligned in block 2.

Figure 8:
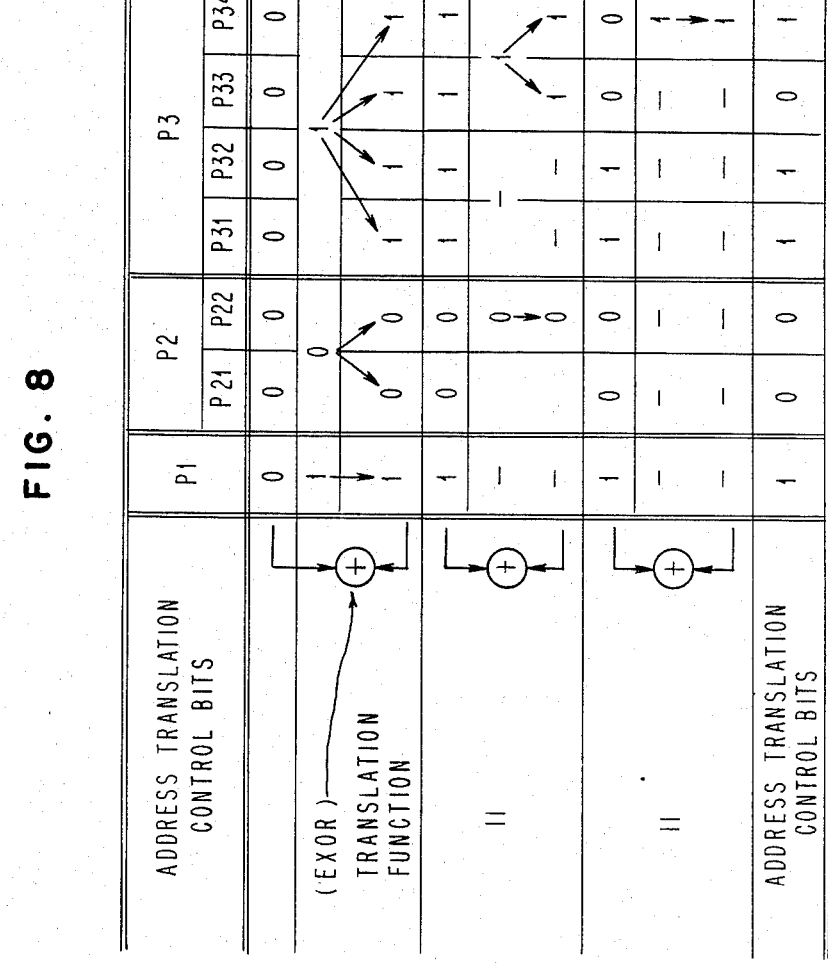

In such a situation, the algorithm is once again executed for the memory block 1 only to find the most suitable values of translation control bits P22, P33, P34, equal to 0,1,1 respectively. Suppose this step also leaves one fault alignment in the sub-block 2 of block 1. Therefore, the algorithm is again executed on the 2-row memory sub-block 2 of block 1 to find the value of P34 to be '1' to remove all the alignments. The final values of 7 bit translation control results by Exoring on bit by bit basis as shown in step 3 of FIG. 8.

Figure 9:
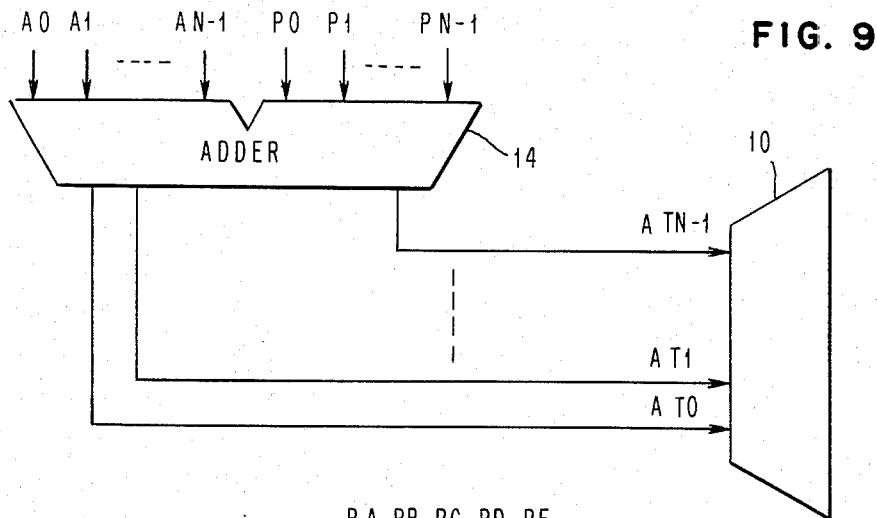
Figure 10:
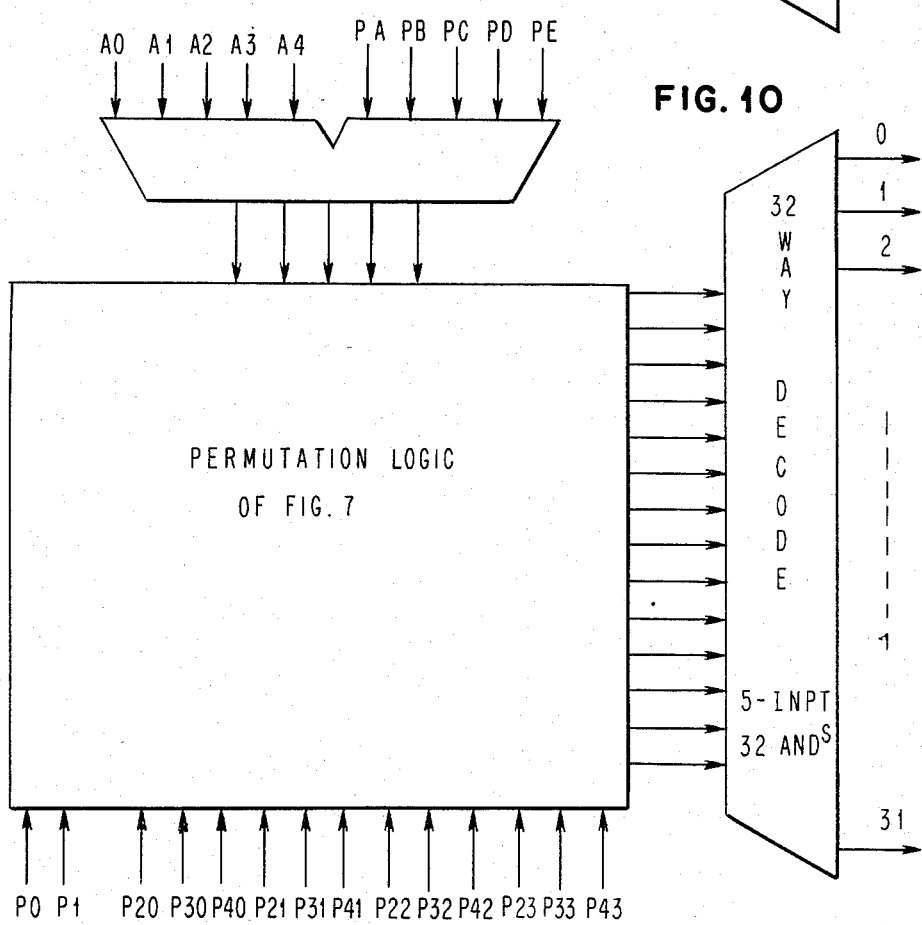

The exclusive OR circuit can be considered as a half-adder. Applicants propose that an n input full adder be used for permutation as shown in FIG. 9. The adder receives the address bits A0 to $A^{n-1}$ with the permutation bits P0 to $P^{n-1}$ and resultant sum be used as decoder access bits. The carry is ignored so that the adder would perform a shift rotate function.

Figure 11:
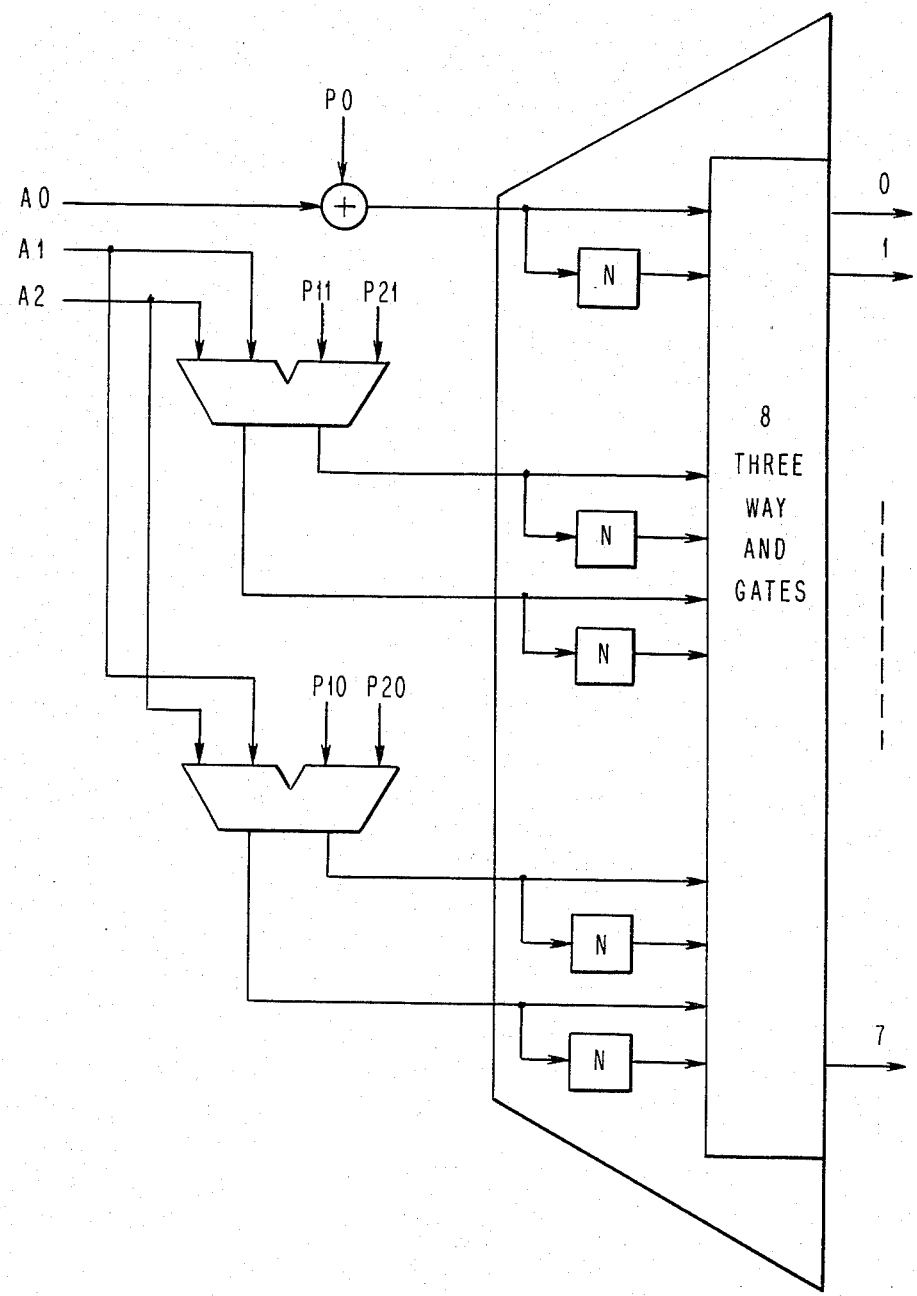

The adder could be used above or used to permute the inputs A0 and An of a permutation device as described in connection with FIGS. 1 to 8 to increase the possible permutations. Adders 14 can be used in sets to access a decoder as shown in FIG. 11.

Many small full adders of less than n bits can also be used to provide address translation by performing shift rotate translation within the desired block only.

This extension will also provide $2^{n+k}$ address translations on $2^n$ address rows where $k \geq 0$. Thus allowing an address translation capability similar to (n+k) Exor circuits described in FIGS. 1 to 7.

Above, we have described a number of embodiments of our invention. Therefore, it should be understood that many modifications and changes can be made in the illustrated embodiments without departing from the spirit and scope of the invention as represented in the attached claims.

Having thus described our invention, what we claim as new, and desire to secure by Letters Patent is:

1. In a memory system made up of logical data words each with its bit positions accessed by the same logical address bits through permuting means which converts the logical address to actual address bits of a data bit on the basis of permutation bits that are selected to distribute faulty data bits among the logical data words and thereby eliminate error conditions in the logical data words that are uncorrectable by the error correcting code protecting the memory system, a permuted decoder means comprising:
   permutation bit means for supplying n+m permutation bits to be used to permute n of said logical address bits where n and m are positive integers;
   permutation means for receiving said n address bits and the n+m permutation bits from said permutation bit means and for providing n+m actual address bits; and
   partial decoder means including gate means responsive to the true and complements of the n+m actual address bits for decoding the n+m actual address bits from said permutation means into one of no more than $2^n$ possible locations.

2. The memory system of claim 1 wherein said permutation means includes n+m exclusive OR means each responsive to one of the n address bits and a different one of the n+n permutation bits for n+m actual address bits so that at least one of the n address bits is fed to more then one of the Exclusive OR means.

3. The memory system of claim 2 including full-adder means adding a set of n address bits with n permutation bits to generate the first mentioned n address bits.

4. The memory of claim 1 wherein said permutation means includes a plurality of permutation modules at least one of said modules comprising permutation element means for receiving an address bit and a+b permutation bits to provide a+b actual address bits to the decoder means where a and b are positive integers.

5. In a memory system made up of logical data words each with its bit positions accessed by the same logical address bits through permuting means which converts the logical address to actual address bits of a data bit on the basis of permutation bits that are selected to distribute faulty data bits among the logical data words and thereby eliminate error conditions in the logical data words that are uncorrectable by the error correcting code protecting the memory system, a permuted decoder means comprising:
   a plurality, n, of k bit full-adder means each adder means receiving k address bits and k permutation bits to generate k partial sum output bits with no carry where n and k are positive integers,
   a decoder means for receiving the n times k (n×k) output bits of said plurality of full-adder means and decoding said output bits to select one of of $2^{n \times k}$ outputs of said decoder means.

* * * * *